Dec. 23, 1924.
W. B. RUSHMER
1,520,445
LENS PATTERN
Filed April 24, 1920
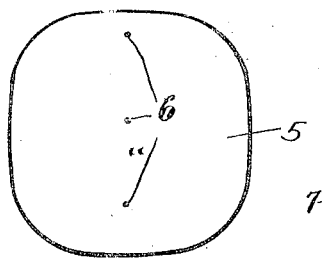
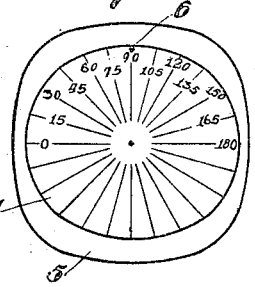
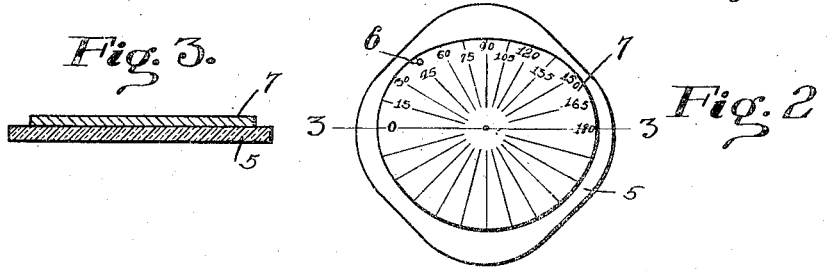
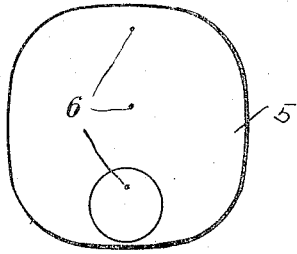
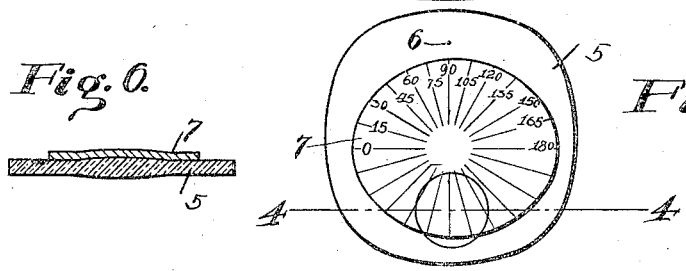
Inventor
W. B. Rushmer
By C. A. Snow & Co.
Attorneys Patented Dec. 23, 1924.

1,520,445

UNITED STATES PATENT OFFICE.

WILLIAM B. RUSHMER, OF SALT LAKE CITY, UTAH.

LENS PATTERN.

Application filed April 24, 1920. Serial No. 376,348.

*To all whom it may concern:*

Be it known that I, WILLIAM B. RUSHMER, a citizen of the United States, residing at Salt Lake City, in the county of Salt Lake and State of Utah, have invented a new and useful Lens Pattern, of which the following is a specification.

This invention relates to the manufacture of optical lenses, and it is the primary object of the invention to provide a novel pattern to be employed as a guide to facilitate the cutting or forming of lenses.

A further object of the invention is to provide a transparent pattern formed of substantially flexible material to act as a guide for the use of a hand diamond cutter, the pattern being such as to permit the bifocal portion of a lens to be properly located in the formation of a bifocal lens.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:—

Figure 1 illustrates a plan view of a lens blank.

Figure 2 illustrates a plan view showing a pattern as applied to the lens blank, to be formed at a 45 degree angle with respect to the vertical.

Figure 3 illustrates a sectional view taken on line 3—3 of Figure 2.

Figure 4 is a view showing the pattern as applied to a lens blank to be cut.

Figure 5 is a plan view of a bifocal lens blank.

Figure 6 illustrates a sectional view taken on line 4—4 of Figure 4.

Figure 7 illustrates a pattern positioned is the formation of a lens to be formed at a 90° angle with respect to the vertical.

Referring to the drawing in detail, the reference character 5 designates the lens blank, the grinding operation having been completed to properly shape the opposite surfaces of the lens, and as shown this lens blank is provided with markings indicated at 6 to show the correct axis of the lens.

The pattern indicated at 7, is formed of any suitable flexible transparent material, preferably celluloid, so that the pattern will conform to the curvature of the lens surface under operation, the pattern being however formed with a predetermined configuration according to the size and shape of the lens to be cut.

On each lens pattern, are formed in any suitable manner a plurality of lines radiating from a common center, the correct axis of the particular pattern being shown by the numerals 0 to 180, the numerals being disposed to indicate predetermined lines to enable an operator to form or cut a lens at any desired axis.

It is to be understood that in the use of lens patterns, constructed in accordance with the present invention, to carry out the present system, it is intended that a number of these lens patterns should be provided, there being a pattern for each standard shape of lens.

By reference to Figure 4 of the drawing, it is obvious that due to the transparent qualities of the pattern, the bifocal portion of a lens may be located through the pattern, to the end that when the finished lens is produced, the bifocal portion thereof will have its correct location with respect to the body portion of the lens, thus insuring against the bifocal portion of the lens being disposed laterally of its axis. It might be further stated that due to the flexibility of the pattern, the pattern will conform to the curvature of the lens surface to eliminate any possibility of the lens pattern slipping, while in use.

In the use of the lens pattern, the pattern is properly positioned on the lens blank, to bring the correct axis of the lens under predetermined lines of the blank, whereupon the operator holds the blank against movement, while the hand diamond cutting tool is moved around the periphery of the pattern to cut the lens blank.

Having thus described the invention, what is claimed as new is:—

In a lens pattern, a transparent body portion cut to conform to the curvature of a lens, said body portion having a plurality of lines radiating from a common center, and said pattern adapted to be used in connection with a lens blank having indicating dots formed thereon, the lines of the pattern being designed for positioning over the dots so that the pattern may be held in a particular manner while the lens blank is being cut.

In testimony that I claim the foregoing as my own, I have hereto affixed my signature in the presence of two witnesses.

WILLIAM B. RUSHMER.

Witnesses:
  J. ORTH THOMPSON,
  WESLEY V. KING.